US011743169B2

(12) United States Patent
Jain et al.

(10) Patent No.: US 11,743,169 B2
(45) Date of Patent: Aug. 29, 2023

(54) PATH COMPUTATION SYSTEMS AND METHODS FOR CONCURRENT BI-DIRECTIONAL K-OPTIMAL PATHS

(71) Applicant: Ciena Corporation, Hanover, MD (US)

(72) Inventors: Ankur Jain, Gurgaon (IN); John Wade Cherrington, Salt Spring Island (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/191,836

(22) Filed: Mar. 4, 2021

(65) Prior Publication Data

US 2022/0231938 A1    Jul. 21, 2022

(30) Foreign Application Priority Data

Jan. 20, 2021    (IN) .............................. 202111002750

(51) Int. Cl.
*H04L 45/122*    (2022.01)
*H04L 45/02*    (2022.01)
*H04L 45/44*    (2022.01)
*H04L 45/12*    (2022.01)

(52) U.S. Cl.
CPC ............ *H04L 45/122* (2013.01); *H04L 45/02* (2013.01); *H04L 45/123* (2013.01); *H04L 45/44* (2013.01)

(58) Field of Classification Search
CPC ....... H04L 45/22; H04L 45/02; H04L 45/123; H04L 45/44
See application file for complete search history.

(56) References Cited

U.S. PATENT DOCUMENTS

| 6,310,883 | B1 | 10/2001 | Mann et al. |
| 7,027,388 | B2 | 4/2006 | Wen et al. |
| 7,206,281 | B2 | 4/2007 | Chen et al. |
| 7,339,889 | B2 | 3/2008 | Lee et al. |

(Continued)

OTHER PUBLICATIONS

A. Felner, "Position Paper: Dijkstra's Algorithm versus Uniform Cost Search or a Case Against Dijkstra's Algorithm" Proceedings, The Fourth International Symposium on Combinatorial Search (SoCS-2011), Association for the Advancement of Artificial Intelligence, 2011, pp. 47-51.

(Continued)

*Primary Examiner* — Chris Parry
*Assistant Examiner* — Dixon F Dabipi
(74) *Attorney, Agent, or Firm* — Baratta Law PLLC; Lawrence A. Baratta, Jr.

(57) ABSTRACT

Systems and methods include, responsive to defining a routing graph that includes vertices for each node of a plurality of nodes in a network and edges for links interconnecting the plurality of nodes, receiving a request for k shortest paths, where k is an integer>0, between a source node and a destination node of the plurality of nodes; and determining the k shortest paths utilizing a k-shortest path algorithm that utilizes two threads in parallel for each shortest path query, wherein the two threads include i) a shortest path query from the source node to the destination node and ii) a shortest path query from the destination node to the source node. The determining further includes, responsive to a first thread in each shortest path query obtaining a result, utilizing the result from the first thread and terminating a second thread.

17 Claims, 3 Drawing Sheets

(56) References Cited

U.S. PATENT DOCUMENTS

| | | |
|---|---|---|
| 7,376,086 B1 | 5/2008 | Paraschiv et al. |
| 7,477,843 B1 | 1/2009 | Peeters et al. |
| 7,508,755 B2 * | 3/2009 | Liu .................. H04L 45/00 |
| | | 370/395.32 |
| 8,046,451 B2 | 10/2011 | Shah-Heydari |
| 8,457,001 B2 | 6/2013 | Madrahalli et al. |
| 8,509,618 B2 | 8/2013 | Boertjes et al. |
| 8,531,969 B2 | 9/2013 | Ong et al. |
| 8,559,812 B2 | 10/2013 | Oltman et al. |
| 8,682,160 B2 | 3/2014 | Prakash et al. |
| 8,750,127 B2 * | 6/2014 | Zhang .................. H04L 45/22 |
| | | 370/238 |
| 8,854,955 B2 | 10/2014 | Prakash et al. |
| 8,854,997 B2 | 10/2014 | Clow et al. |
| 9,054,831 B2 | 6/2015 | Prakash et al. |
| 9,060,215 B2 | 6/2015 | Miedema |
| 9,357,278 B2 | 5/2016 | Swinkels et al. |
| 9,800,325 B1 | 10/2017 | Skalecki et al. |
| 9,906,294 B2 | 2/2018 | Al Sayeed et al. |
| 9,948,387 B2 | 4/2018 | Frankel et al. |
| 10,033,623 B2 | 7/2018 | Jain et al. |
| 10,097,306 B1 | 10/2018 | Chhillar et al. |
| 10,148,578 B2 | 12/2018 | Morris et al. |
| 10,521,473 B2 * | 12/2019 | Jin .................. H04L 45/122 |
| 2004/0073702 A1 * | 4/2004 | Rong .................. H04L 45/20 |
| | | 709/241 |
| 2005/0088978 A1 | 4/2005 | Zhang et al. |
| 2006/0203747 A1 | 9/2006 | Wright et al. |
| 2011/0116366 A1 | 5/2011 | Smith et al. |
| 2012/0044811 A1 * | 2/2012 | White .................. H04L 45/64 |
| | | 370/238 |
| 2013/0070617 A1 * | 3/2013 | Clow .................. H04L 45/124 |
| | | 370/252 |
| 2013/0202299 A1 * | 8/2013 | Prakash .............. H04J 14/0284 |
| | | 398/51 |
| 2014/0044008 A1 | 2/2014 | Skalecki et al. |
| 2015/0256442 A1 * | 9/2015 | Hu .................. G06Q 10/04 |
| | | 370/254 |
| 2016/0037239 A1 | 2/2016 | Chhillar et al. |
| 2016/0043797 A1 | 2/2016 | Sareen et al. |
| 2017/0149646 A1 | 5/2017 | Subhedar et al. |
| 2017/0201323 A1 | 7/2017 | Prakash et al. |
| 2018/0063608 A1 | 3/2018 | Prakash et al. |

OTHER PUBLICATIONS

Tmforum, Frameworx Exploratory Report, "Logical Resource: Network Model Advancement and Insights," TR215, Aug. 2014, pp. 1-60.

J. Yen, "An Algorithm for Finding Shortest Routes From All Source Nodes to a Given Destination in General Networks", vol. XXVII, No. 4, Received Jul. 21, 1968; revised version received Dec. 4, 1698, pp. 526-530.

* cited by examiner

PATH COMPUTATION SYSTEMS AND METHODS FOR CONCURRENT BI-DIRECTIONAL K-OPTIMAL PATHS

FIELD OF THE DISCLOSURE

The present disclosure generally relates to networking. More particularly, the present disclosure relates to path computation systems and methods for concurrent bi-directional k-optimal paths.

BACKGROUND OF THE DISCLOSURE

Path computation in a network involves finding a suitable route for data between a source (ingress) and destination (egress) subject to constraints, policy, costs, weights, etc. The general approach for path computation is to use graph theory where each network node or network element is a vertex, and each link connecting the nodes are edges. With this abstraction, the path computation process becomes a graph problem. This works well in digital networks (packet, Time Division Multiplexed (TDM), Multiprotocol Label Switching (MPLS), etc.). A typical digital network assumes non-blocking switching functionality at a node and simple links connecting nodes, simplifying network topology model and path computation algorithms. Photonic networks have more complicated topologies when compared to digital networks. On the contrary, photonic networks introduce various constraints that complicate both network topology models and path computation. In addition to wavelength blocking on photonic links and wavelength reach, an architecture of a photonic node is custom, each having unique constraints, such as size and type of digital switching fabric, the interconnection between photonic ports and drop side ports or digital fabric, the interconnection between photonic ports and photonic fabric, directionality and photonic port blocking, photonic port protection. That is, photonic networks and some digital networks have unique connectivity constraints at nodes where a simple vertex is no longer feasible for modeling a node.

Conventionally, a Path Computation Element (PCE) maintains (including updating in the face of network change) a routing graph reflecting both existing and potentially existing connectivity across the devices (nodes or network elements). A k-paths algorithm provides the shortest path between a source and destination along with a next k−1 shortest paths (which may be longer than the shortest path). An example of a k-paths algorithm includes Yen's algorithm described in Yen, J. Y., "An algorithm for finding shortest routes from all source nodes to a given destination in general networks." Quarterly of Applied Mathematics 27 (1970): 526-530, the contents of which are incorporated by reference. Of note, Yen's algorithm utilizes Dijkstra's algorithm to find the shortest path between two nodes.

Dijkstra's algorithm is inherently asymmetric by construction: it is essentially a diffusive search emanating from source with termination condition based on destination. That is, Dijkstra's algorithm finds a unidirectional path from a source to a destination. For least-cost routing on graph including bi-directional edges, the shortest path (modulo any equal cost paths) will be the same in either direction. However, in practice, the run-time of Dijkstra will be faster in one direction than the other. As is known in the art, run-time refers to the amount of time a processing device takes to complete a path computation. It turns out in practice for real networks, a particularly important case is when there is in fact no path. When this is the case, if there is a lot of connectivity that can be reached from the source but much less from the destination, then very long execution times can be seen if Dijkstra's algorithm is run with standard source-destination arguments.

BRIEF SUMMARY OF THE DISCLOSURE

The present disclosure relates to path computation systems and methods for concurrent bi-directional k-optimal paths. Specifically, the systems and methods include an approach for finding k-optimal paths (k is an integer>0) on a network graph having bi-directional links. Path computation is performed on a processing device associated with a network, such as a Network Management System (NMS), Path Computation Engine (PCE), etc. The present disclosure provides a parallelized approach to path computation. Specifically, the present disclosure provides an approach shown to work efficiently in large networks with complex connectivity using an approach of running path computation simultaneously form both sides (from nodes A to Z and from nodes Z to A) that allow early exit when there is a no-connectivity case in either direction since a path need be bi-directional. This is shown to stand out prominently in large operator field deployments (and it also improves the average case).

In various embodiments, the present disclosure includes a method including steps, an apparatus with a processor configured to implement the steps, and a non-transitory computer-readable medium having instructions stored thereon for programming a processing device to perform the steps. The steps include, responsive to defining a routing graph that includes vertices for each node of a plurality of nodes in a network and edges for links interconnecting the plurality of nodes, receiving a request for k shortest paths, where k is an integer>0, between a source node and a destination node of the plurality of nodes; and determining the k shortest paths utilizing a k-shortest path algorithm that utilizes two threads in parallel for each shortest path query, wherein the two threads include i) a shortest path query from the source node to the destination node and ii) a shortest path query from the destination node to the source node.

The determining can further include, responsive to a first thread of the two threads in each shortest path query obtaining a result, utilizing the result from the first thread and terminating a second thread of the two threads. The result can include any of i) no connectivity between the source node and the destination node and ii) a path between two nodes that are used in each shortest path query. The result can include any of i) no connectivity between the source node and the destination node, ii) a failure to find a path due to failure of a constraint associated with the request, and iii) a path between two nodes that are used in each shortest path query. Each shortest path query only uses a result from one of the two threads. The k-shortest path algorithm can be Yen's algorithm and each shortest path query can utilize Dijkstra algorithm. The steps can further include obtaining data from the network, wherein the data includes a topology that describes how a plurality of network elements in the network are connected via the links and additional data defining any of bandwidth availability and spectrum availability on the links; and defining the routing graph based on the topology.

BRIEF DESCRIPTION OF THE DRAWINGS

The present disclosure is illustrated and described herein with reference to the various drawings, in which like refer

DETAILED DESCRIPTION OF THE DISCLOSURE

The present disclosure relates to path computation systems and methods for concurrent bi-directional k-optimal paths. Specifically, the systems and methods include an approach for finding k-optimal paths (k is an integer>0) on a network graph having bi-directional links. Path computation is performed on a processing device associated with a network, such as a Network Management System (NMS), Path Computation Engine (PCE), etc. The present disclosure provides a parallelized approach to path computation. Specifically, the present disclosure provides an approach shown to work efficiently in large networks with complex connectivity using an approach of running path computation simultaneously form both sides (from nodes A to Z and from nodes Z to A) that allow early exit when there is a no-connectivity case in either direction since a path need be bi-directional. This is shown to stand out prominently in large operator field deployments (and it also improves the average case).

Example Network

Figure 1:
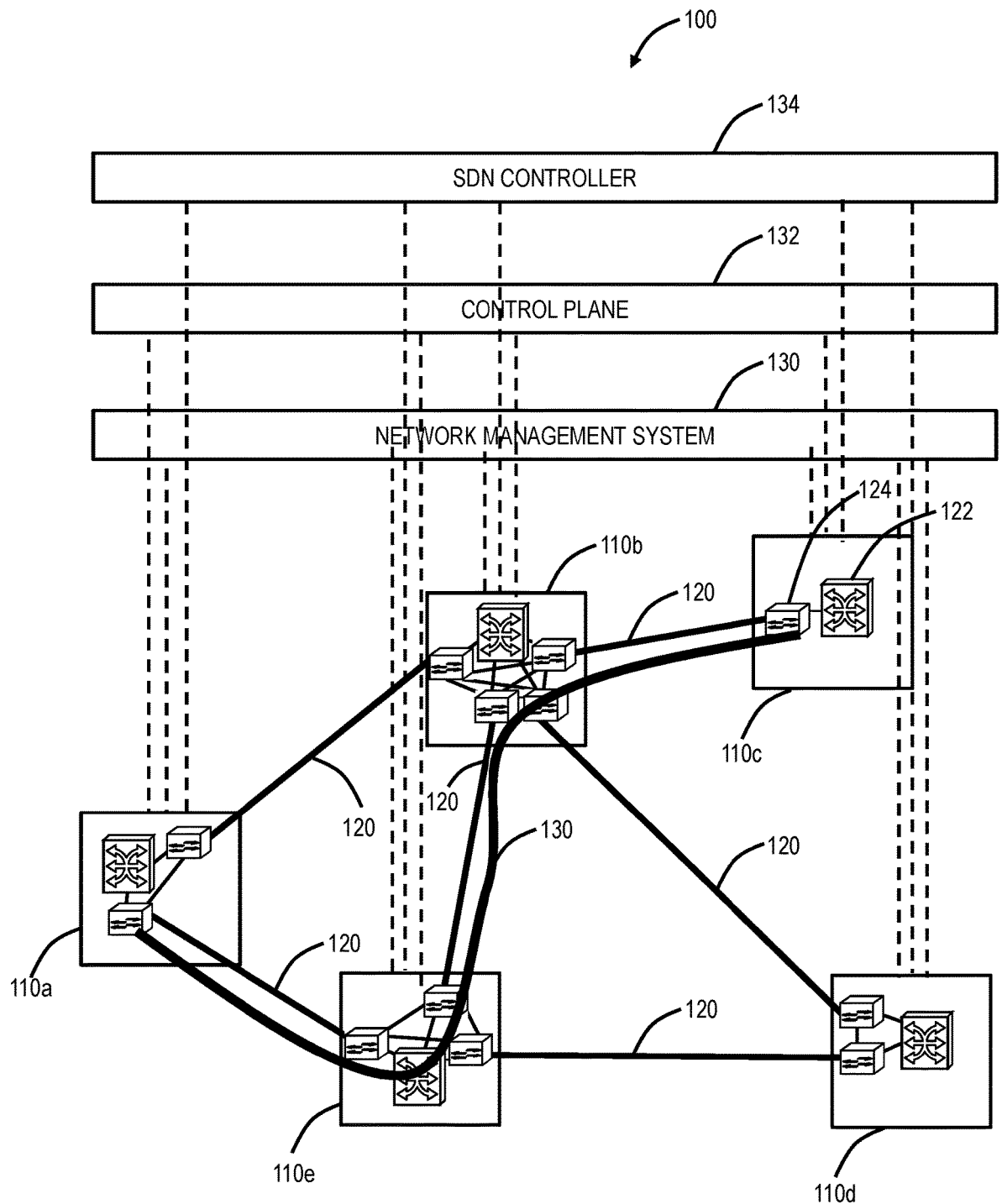
- FIG. 1 is a network diagram of an example network with five interconnected sites.

FIG. 1 is a network diagram of an example network 100 with five interconnected sites 110a, 110b, 110c, 110d, 110e. The sites 110 are interconnected through a plurality of links 120. Each of the sites 110 can include a switch 122 and one or more Wavelength Division Multiplexing (WDM) network elements 124, as well as other network elements and devices omitted for simplicity. The switch 122 is configured to provide services at Layers 1 (e.g., OTN/SONET/SDH), Layer 2 (e.g., Ethernet, Multilayer Protocol Switching (MPLS), etc.), Layer 3 (e.g., Internet Protocol (IP), and the like as well as combinations thereof. The WDM network elements 124 provide the photonic layer (e.g., Layer 0) and various functionality associated therewith (e.g., multiplexing, amplification, optical routing, wavelength conversion/regeneration, local add/drop, etc.). Of note, while shown separately, those of ordinary skill in the switch 122 and the WDM network elements 124 may be realized in the same network element. The photonic layer can also include intermediate amplifiers and/or regenerators on the links 120, which are omitted for illustration purposes. The network 100 is illustrated, for example, as an interconnected mesh network, and those of ordinary skill in the art will recognize the network 100 can include other architectures, with additional sites 110 or with fewer sites, with additional network elements and hardware, etc. The network 100 is presented herein as an embodiment for implementing the path computation systems and methods.

The sites 110 communicate with one another optically over the links 120. The sites 110 can be network elements which include a plurality of ingress and egress ports forming the links 120. Further, the nodes 110 can include various degrees, i.e., the site 110c is a one-degree node, the sites 110a, 110d are two-degree nodes, the site 110e is a three-degree node, and the site 110b is a four-degree node. The number of degrees is indicative of the number of adjacent nodes at each particular node. The network 100 is illustrated with a connection 130 between the sites 110a, 110c and through the sites 110b, 110e. The connection 130 can be a Subnetwork Connection (SNC), Label Switched Path (LSP), or any other end-to-end connection that can utilize the path computation systems and methods. Further, the connection 130 can include various different aspects such as a wavelength, Time Division Multiplexing (TDM) traffic, packet traffic, and a combination therein.

The preceding descriptions focus on L0/L1 aspects of the network 100. Additionally, the network 100 can include other components forming L2 and/or L3 connections in the network 100, such as routers, switches, packet-optical transport systems, and the like. That is, the network 100 can include Ethernet, Virtual Local Area Network (VLAN), MPLS, IP, etc. connections as well. In an embodiment, the path computation systems and methods can operate at a single Layer (L0, L1, L2, or L3), and in another embodiment, the path computation systems and methods can operate at multiple layers.

The network 100 can include a Network Management System (NMS) 130 that can provide an interface for Operations, Administration, Maintenance, and Provisioning (OAM&P) functions. The NMS 130 can also include a PCE. Also, the network 100 can include a control plane 132 operating on and/or between the switches 122 at the sites 110a, 110b, 110c, 110d, 110e. The control plane 132 includes software, processes, algorithms, etc. that control configurable features of the network 100, such as automating the discovery of the switches 122, the capacity of the links 120, port availability on the switches 122, connectivity between ports; dissemination of topology and bandwidth information between the switches 122; calculation and creation of paths for connections; network-level protection and restoration; and the like. In an embodiment, the control plane 132 can utilize Automatically Switched Optical Network (ASON), Generalized Multiprotocol Label Switching (GMPLS), Optical Signal and Routing Protocol (OSRP) (from Ciena Corporation), or the like. Those of ordinary skill in the art will recognize the network 100, and the control plane 132 can utilize any type of control plane for controlling the switches 122 and establishing connections therebetween.

A path (e.g., SNC, LSP, etc.) is considered valid for connection setup based on the availability of the switch 122, the links 120, and sufficient bandwidth available thereon, in addition to the various aspects described herein with respect to the constrained path computation systems and methods. Photonic networks, i.e., Layer 0 and the wavelength interconnectivity of the WDM network elements 124, introduce additional complexity of successfully setting up a service.

The network 100 can also include a Software-Defined Networking (SDN) controller 134. In an embodiment, the SDN controller 134, the control plane 132, and the NMS 140 can work together. In another embodiment, the SDN controller 134 can operate independently with or without the control plane 132. In a further embodiment, the SDN controller 134 may be omitted. SDN allows the management of network services through abstraction of lower-level functionality. This is done by decoupling the system that makes decisions about where traffic is sent (SDN control through the SDN controller 134) from the underlying systems that forward traffic to the selected destination (i.e., the physical equipment in the network 100). Work on SDN calls for the ability to centrally program provisioning of forwarding on the network 100 for more flexible and precise control over network resources to support new services. The SDN controller 134 is a processing device that has a global view of the network 100. Additionally, the SDN controller 134 can include or connect to SDN applications which can utilize the data from the SDN controller 134 for various purposes. In an embodiment, the SDN applications include path computation systems and methods that are described in detail herein.

Specifically, the present disclosure provides path computation systems and methods. Those skilled in the art will recognize these can be implemented at any of the network management system 130, the control plane 132, the SDN controller 134, as well as in-skin (locally on a network element). The preceding description utilizes the term "PCE" to denote an element associated with the network 100 for performing path computation. The PCE may be a conventional PCE element, but can also be a software module implemented at any of the management system 130, the control plane 132, the SDN controller 134, and in-skin at a network element.

Path Computation

The present disclosure relates to obtaining bi-directional k-optimal paths in a network, such as the network 100. A typical approach to path computation involves using a routing graph to represent the network 100. As is well-known in the art, a routing graph includes vertices (nodes) that represent network elements, e.g., the switches 122, the WDM network elements 124, etc., and edges (links) that represent connectivity between the vertices (e.g., the links 120). This modeling is convenient because once the network 100 is modeled in the routing graph, a path can be determined using various algorithms.

Motivation

In an NMS setting under conditions where a PCE is meaningfully run (i.e., the network state has been fully loaded, up to steady-state changes), processing cores that come relatively cheap with modern hardware and are instrumental in dealing with high churn regimes become often idle. Thus, it can be strategic to find ways of leveraging the parallelism possible with these multiple cores to accelerate high compute operations such as service routing. However, historically overall optimum shortest path algorithms are notoriously difficult to parallelize effectively. The concept of running path computation simultaneously form both sides allows early exit from the no-connectivity case, which has been found to stand out prominently in large operator field deployments (and it also improves the average case).

Figure 2:
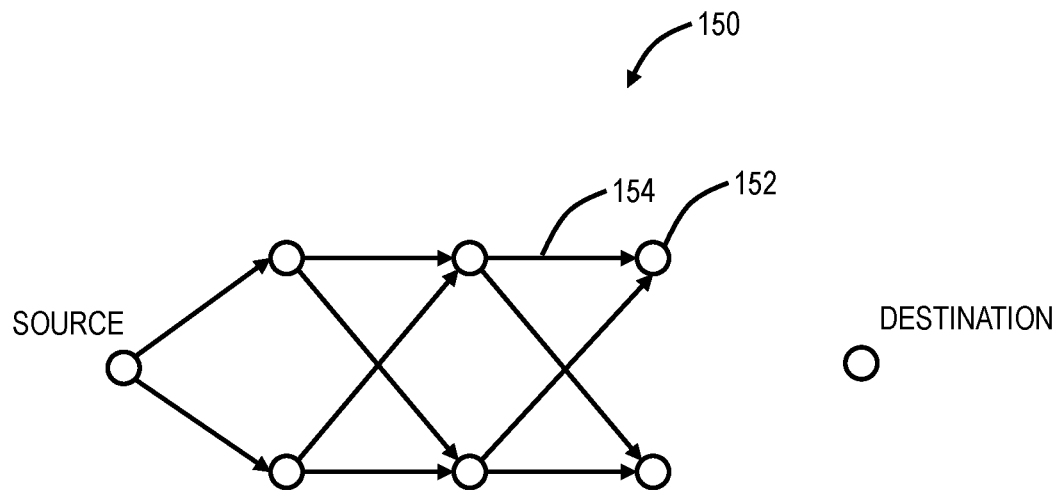
FIGS. 2 and 3 are example routing graphs representing different networks for describing path computation.
Figure 3:
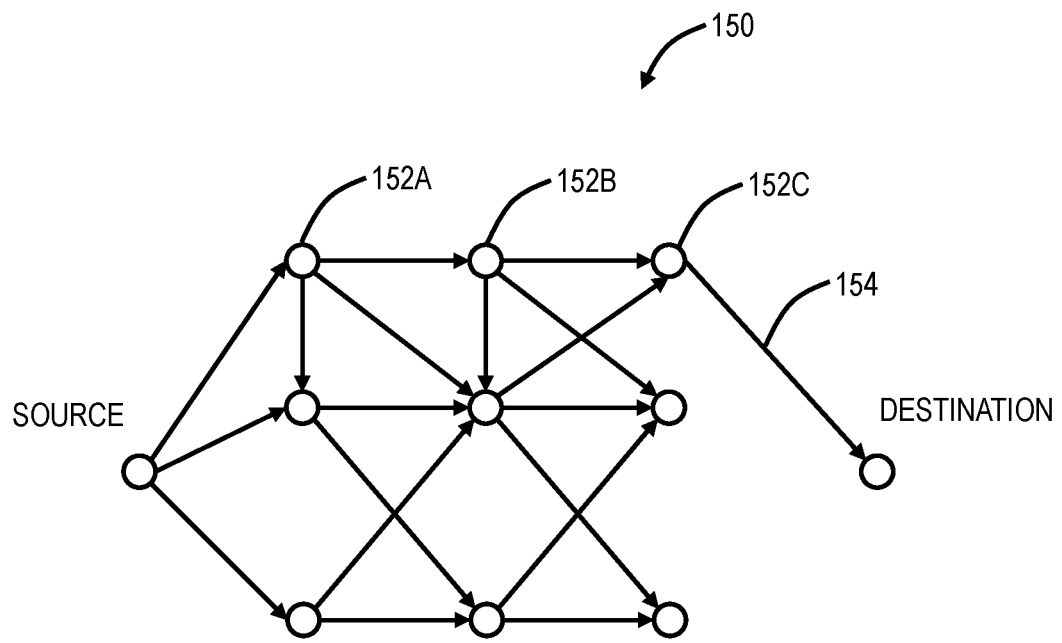

Let's begin by providing the key motivating problem that leads to the present disclosure. FIGS. 2 and 3 are example routing graphs 150 representing different networks for describing path computation. Again, the routing graph 150 includes vertices 152 and edges 154. The edges 154 can be directed edges as well. FIG. 2 is an example of a routing graph 150 in a form where no path is ultimately found from source to destination. This will generally result from one or both conditions:

The destination node has no topological connectivity to the source node, or

The connectivity to the destination node is invalid because of applied constraints.

In order to compute the shortest path from source to destination, the standard Dijkstra algorithm will traverse the entire routing graph 150 (starting from source and expanding outwards). This takes a lot of time before it gives the result that there is no path possible. For example, in a large network with 500K+ edges in the routing graph 150, this time comes out to be in the order of 500 ms. Of note, this often occurs in large networks, namely, there is no connectivity from the source to the destination, and the lack of connectivity is found towards the destination node.

Now, to the more realistic case in an NMS or PCE where the user or user agent will want to choose from among multiple path options—up to a cut-off k. If the routing graph 150 exists in a form where only one (or less than k) isolated path exist from source to destination, then Yen's k-shortest paths algorithm tries to take edges from that path (as root segment) and invokes the Dijkstra algorithm multiple times to compute the spur path which results in the next shortest path. In this case, similarly poor performance may be seen on the majority of times Dijkstra is invoked as the majority of the routing graph 150 is explored before reaching the lack of connectivity.

FIG. 3 is another routing graph for illustrating a simple example. The present disclosure assumes the use of Yen's k-shortest paths algorithm, which may simply be referred to as Yen or Yen's algorithm herein. Of course, other k-shortest path algorithms are also contemplated. Yen computes the first shortest path using Dijkstra as Source→A→B→C→Destination, where A, B, and C are vertices 152A, 152B, 152C, respectively. Yen then takes Source→A as a root path and computes a path from vertex 152A to the destination excluding the edge A→B using Dijkstra, for that it will traverse the entire routing graph 150 in this case but will be unable to find a path. Yen then takes Source→A→B as the root path and computes a path from vertex 152B→Destination excluding the edge B→C using Dijkstra and again traverses the entire routing graph 150 without finding a path. And the approach continues like this.

Again, in a large network, with 500K+ edges, each iteration of Dijkstra where a path is not found takes in the order of 500 ms, resulting in overall time going into minutes. That is, in each case in FIGS. 2 and 3, there is a need to traverse the entire routing graph 150 because it started from the source, but if it had traversed from the destination by reversing all the edges of the directed routing graph 150, it could get the result very fast.

Bi-Directional Path Computation Process

The present disclosure adds two threads in parallel for every shortest path query, namely one from a source node to a destination node and another in reverse from a destination node to the source node. Of course, this adds additional calculations in the path computation process, but at the expense of faster run-time because when either thread returns a result, the other thread is interrupted and killed. This approach terminates the cases shown in FIGS. 2 and 3 quickly.

The present disclosure contemplates any k-shortest paths algorithm. Generally, a k-shortest paths algorithm is configured to use the routing graph 150 to find k-optimal paths. For example, k-shortest paths algorithms include Yen's algorithm, as well as the Dijkstra algorithm or Bellman-Ford algorithm that is extended to find more than one path, i.e., k paths. The following description assumes the Dijkstra algorithm is used to find each individual path. Of course, any shortest path algorithm is contemplated.

Again, Dijkstra's algorithm is inherently asymmetric by construction: it is essentially a diffusive search emanating from source with termination condition based on destination. That is, Dijkstra's algorithm finds a unidirectional path from a source to a destination. For least-cost routing on graph including bi-directional edges, the shortest path (modulo any equal cost paths) will be the same in either direction. However, in practice, the run-time of Dijkstra will be faster in one direction than the other. As is known in the art, run-time refers to the amount of time a processing device takes to complete a path computation. It turns out in practice for real networks, a particularly important case is when there is in fact no path, as shown in FIGS. 2 and 3. When this is the case, if there is a lot of connectivity that can be reached from the source but much less from the destination, then very long execution times can be seen if Dijkstra's algorithm is run with standard source-destination arguments.

It is this aspect that Dijkstra's algorithm runs faster in one direction than the other that enables the present disclosure to improve speed and parallelize the computation, even while adding an extra thread to every computation. The present disclosure assumes that in the network 100, a path from the source to the destination is equally valid from the destination to the source. That is, every path is bi-directional, and the path can be a wavelength, TDM timeslots, packet capacity, etc.

Figure 4:
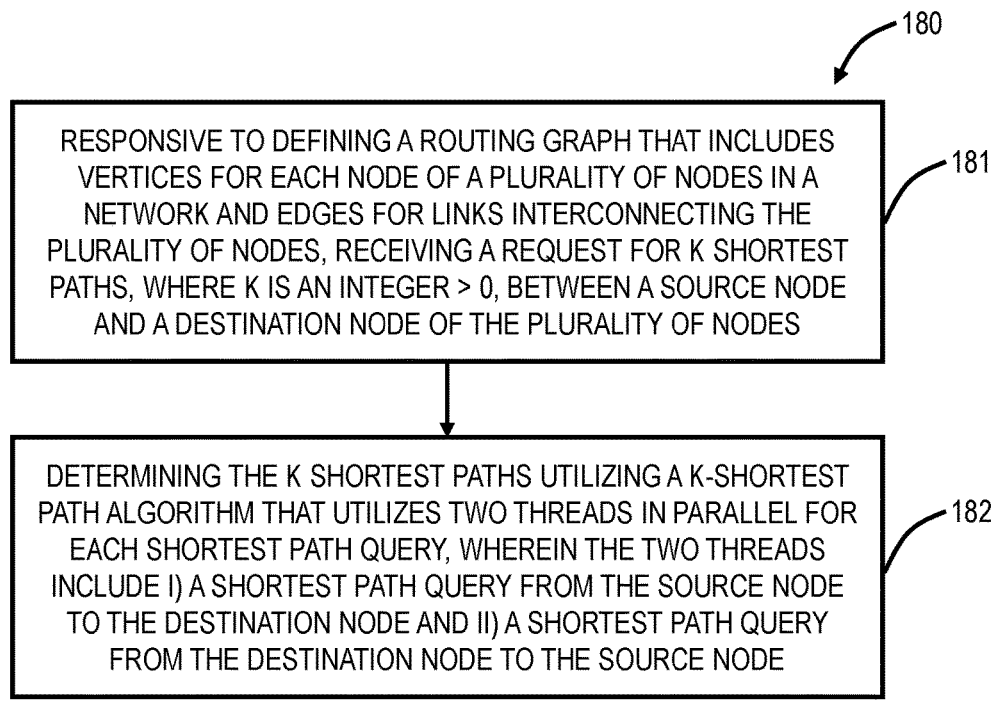
FIG. 4 is a flowchart of a bi-directional path computation process.

FIG. 4 is a flowchart of a bi-directional path computation process 180. The bi-directional path computation process 180 can be a method with steps, embodied as instructions stored in a non-transitory computer-readable medium for programming a processing device to perform the steps, and implemented via a processing device executing the steps, e.g., a PCE, NMS, in-skin controller in a network element, etc.

The bi-directional path computation process 180 includes, responsive to defining a routing graph that includes vertices for each node of a plurality of nodes in a network and edges for links interconnecting the plurality of nodes, receiving a request for k shortest paths, where k is an integer>0, between a source node and a destination node of the plurality of nodes (step 181); and determining the k shortest paths utilizing a k-shortest path algorithm that utilizes two threads in parallel for each shortest path query, wherein the two threads include i) a shortest path query from the source node to the destination node and ii) a shortest path query from the destination node to the source node (step 182).

The determining can further include, responsive to a first thread of the two threads in each shortest path query obtaining a result, utilizing the result from the first thread and terminating a second thread of the two threads. The result can include any of i) no connectivity between the source node and the destination node and ii) a path between two nodes that are used in each shortest path query. The result can also include any of i) no connectivity between the source node and the destination node, ii) a failure to find a path due to failure of a constraint associated with the request, and iii) a path between two nodes that are used in each shortest path query.

Again, this approach increases the computation and each shortest path query only uses a result from one of the two threads. This helps in failing fast, such as in FIGS. 2 and 3, as opposed to fully exploring the routing graph 150 before failing. In an embodiment, the k-shortest path algorithm is Yen's algorithm and each shortest path query utilizes Dijkstra algorithm.

The bi-directional path computation process 180 can include obtaining data from the network, wherein the data includes a topology that describes how a plurality of network elements in the network are connected via the links and additional data defining any of bandwidth availability and spectrum availability on the links; and defining the routing graph based on the topology.

Based on experiments, it is observed that in a large network with 500K+ edges where it was taking 500 ms for normal Dijkstra, with two threads, it takes less than 1 ms in a reverse Dijkstra algorithm and therefore the overall time for k-shortest path algorithm also reduces significantly, can be returned in sub-seconds rather than minutes.

This approach is specifically well suited to network management requirements of multiple paths and rapid response to user. Multi-sided Dijkstra (sometimes called "bi-directional" Dijkstra) can be combined within Yen's k-shortest paths algorithm for significant advantage in telecom network routing that arise in practice. Specifically, a part of Yen wherein a "spur" sub-path is found using a call to Dijkstra. This sub-path has the original destination as its Dijkstra destination, and its Dijkstra source as a point connected to but different from original source.

An explicit concurrent formulation can include where two processors share memory but pursue the two ends. In particular, early exit is signaled, substantially improving worst-case performance.

This can be combined with a partial validator approach described as follows to maximize changes of early exit in presence of no path or no constraint-satisfying path, statistically doubling the odds of making early exit due to partial validation tactic.

Partial Validation

The exit condition in FIG. 2 is topological disjointness, i.e., there is no link 120 from the source node to the destination node. Another exit condition can be the failure of a constraint. A constraint can be something associated with the request, e.g., latency, hop count, spectrum usage, etc. That is, anything that can yield a true/false or yes/no that can cause a particular path to be found valid or not. The two threads in the bi-directional path computation process 180 may result in early exit if, for example, all points reachable from destination fail partial validation. Essentially, all else being equal, this technique "doubles" that chances of an early exit due to partial validator failure, creating a multiplicative benefit with this other technique.

Multi-Sided Form of Steiner Tree Algorithms

The Steiner tree problem for finding the lowest weight tree connecting N terminals is NP-complete in general. However, it has well-established and widely used bounded approximations that guarantee that solutions are no worse than a multiple greater than 1 (performance ratio) of the ideal solution. One of the most best known family of Steiner tree approximations is based on finding minimum spanning trees on the complete routing graph 150 formed by first computing shortest paths between all terminals, and, for each such path, adding an edge to this graph (known as terminal graph) with weight equal to the total distance of the shortest path. This heuristic can be shown to have a performance ratio of two (finding solutions no worse than 2×ideal solution in polynomial time).

Analogous to the bi-directional path computation process 180 for the shortest path (can be thought of as 2-terminal special case), with N terminals in practice, it can be very valuable to rapidly identify (fail fast on) queries in which terminals do not have any (constraint-satisfying) path to other terminals. For this reason, this approach of multiple threads can be used in the process of forming terminal graph, as many concurrent calls as there are available cores would be used to initiate Dijkstra from different terminals. In small (# terminals<10 for example), all terminals could be explored simultaneously. For a large number of terminals, it will provide statistically faster disjointedness detection (at which point the entire query can be failed). Additionally, as useful feedback to user this approach would be a quick way to report back which "islands" of terminals can speak to each other, so the network can more readily be corrected to provide the desired fully connected tree service (or alternatively for user to ask for a service with smaller number of terminals).

Processing Device

Figure 5:
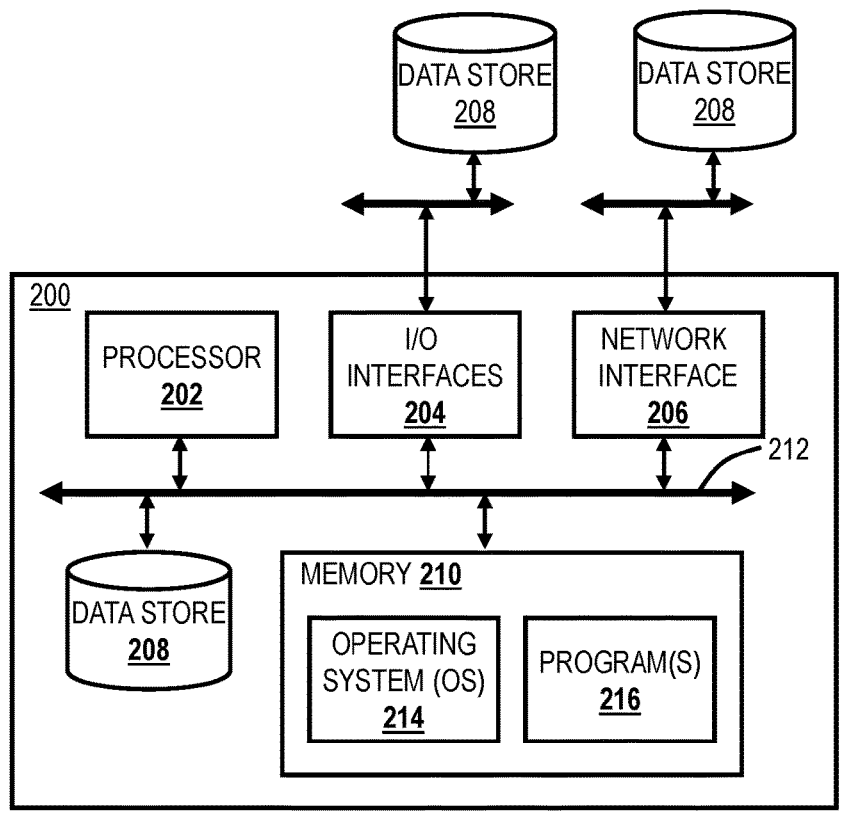
FIG. 5 is a block diagram of a processing device.

FIG. 5 is a block diagram of a processing device 200 for use herein. The processing device 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 5 depicts the processing device 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the processing device 200, a semiconductor-based microprocessor (in the form of a microchip or chipset), or generally any device for executing software instructions. When the processing device 200 is in operation, the processor 202 is configured to execute software stored within the memory 210, to communicate data to and from the memory 210, and to generally control operations of the processing device 200 pursuant to the software instructions. The I/O interfaces 204 may be used to receive user input from and/or for providing system output to one or more devices or components.

The network interface 206 may be used to enable the processing device 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the processing device 200, such as, for example, an internal hard drive connected to the local interface 212 in the processing device 200. Additionally, in another embodiment, the data store 208 may be located external to the processing device 200, such as, for example, an external hard drive connected to the I/O interfaces 204 (e.g., SCSI or USB connection). In a further embodiment, the data store 208 may be connected to the processing device 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, one or more processors, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Also, the approach described herein will work for problems that are fundamentally unidirectional. In such case, a reversed edge is added for each original unidirectional edge so it becomes effectively bidirectional for computation purposes. Then, if the reversed Dijkstra thread (destination to source invocation) completes first, flip all the reversed edges to recover the original uni-directed orientation as final output.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable medium having instructions stored thereon for programming a processing device to perform steps of:
   responsive to defining a routing graph that includes vertices for each node of a plurality of nodes in a network and edges for links interconnecting the plurality of nodes, receiving a request for k shortest paths, where k is an integer>0, between a source node and a destination node of the plurality of nodes, wherein the k shortest paths are for route determination in the network between the source node and the destination node; and
   performing path computation by determining the k shortest paths utilizing a k-shortest path algorithm that utilizes two threads in parallel for each shortest path query, wherein the two threads include i) a shortest path query from the source node to the destination node and ii) a shortest path query from the destination node to the source node, and wherein the determining further comprises performing an early exit of the path computation whenever there is any of a no-connectivity case in either of the two threads and failure of a constraint associated with the request, and, responsive to a first thread of the two threads in each shortest path query obtaining a result, utilizing the result from the first thread and terminating a second thread of the two threads.

2. The non-transitory computer-readable medium of claim 1, wherein the result includes any of i) no connectivity between the source node and the destination node and ii) a path between two nodes that are used in each shortest path query.

3. The non-transitory computer-readable medium of claim 1, wherein the result includes any of i) no connectivity between the source node and the destination node, ii) a failure to find a path due to failure of a constraint associated with the request, and iii) a path between two nodes that are used in each shortest path query.

4. The non-transitory computer-readable medium of claim 1, wherein each shortest path query only uses a result from one of the two threads.

5. The non-transitory computer-readable medium of claim 1, wherein the k-shortest path algorithm is Yen's algorithm and each shortest path query utilizes Dijkstra algorithm.

6. The non-transitory computer-readable medium of claim 1, wherein the steps further include
   obtaining data from the network, wherein the data includes a topology that describes how a plurality of network elements in the network are connected via the links and additional data defining any of bandwidth availability and spectrum availability on the links; and
   defining the routing graph based on the topology.

7. A method comprising:
   responsive to defining a routing graph that includes vertices for each node of a plurality of nodes in a network and edges for links interconnecting the plurality of nodes, receiving a request for k shortest paths, where k is an integer>0, between a source node and a destination node of the plurality of nodes, wherein the k shortest paths are for route determination in the network between the source node and the destination node; and
   performing path computation by determining the k shortest paths utilizing a k-shortest path algorithm that utilizes two threads in parallel for each shortest path query, wherein the two threads include i) a shortest path query from the source node to the destination node and ii) a shortest path query from the destination node to the source node, and wherein the determining further comprises performing an early exit of the path computation whenever there is any of a no-connectivity case in either of the two threads and failure of a constraint associated with the request, and, responsive to a first thread of the two threads in each shortest path query obtaining a result, utilizing the result from the first thread and terminating a second thread of the two threads.

8. The method of claim 7, wherein the result includes any of i) no connectivity between the source node and the destination node and ii) a path between two nodes that are used in each shortest path query.

9. The method of claim 7, wherein the result includes any of i) no connectivity between the source node and the destination node, ii) a failure to find a path due to failure of a constraint associated with the request, and iii) a path between two nodes that are used in each shortest path query.

10. The method of claim 7, wherein each shortest path query only uses a result from one of the two threads.

11. The method of claim 7, wherein the k-shortest path algorithm is Yen's algorithm and each shortest path query utilizes Dijkstra algorithm.

12. The method of claim 7, further comprising
    obtaining data from the network, wherein the data includes a topology that describes how a plurality of network elements in the network are connected via the links and additional data defining any of bandwidth availability and spectrum availability on the links; and
    defining the routing graph based on the topology.

13. An apparatus comprising:
    one or more processors and memory comprising instructions that, when executed, cause the one or more processors to
       responsive to defining a routing graph that includes vertices for each node of a plurality of nodes in a network and edges for links interconnecting the plurality of nodes, receive a request for k shortest paths, where k is an integer>0, between a source node and a destination node of the plurality of nodes, wherein the k shortest paths are for route determination in the network between the source node and the destination node, and
       performing path computation by determine the k shortest paths utilizing a k-shortest path algorithm that utilizes two threads in parallel for each shortest path query, wherein the two threads include i) a shortest path query from the source node to the destination node and ii) a shortest path query from the destination node to the source node, and wherein there is an early exit of the path computation from the determine when there is any of a no-connectivity case in either of the two threads and failure of a constraint associated with the request, and wherein the k shortest paths are determined through, responsive to a first thread of the two threads in each shortest path query obtaining a result, utilization of the result from the first thread and termination of a second thread of the two threads.

14. The apparatus of claim 13, wherein the result includes any of i) no connectivity between the source node and the destination node and ii) a path between two nodes that are used in each shortest path query.

15. The apparatus of claim 13, wherein the result includes any of i) no connectivity between the source node and the destination node, ii) a failure to find a path due to failure of a constraint associated with the request, and iii) a path between two nodes that are used in each shortest path query.

16. The apparatus of claim 13, wherein each shortest path query only uses a result from one of the two threads.

17. The apparatus of claim 13, wherein the k-shortest path algorithm is Yen's algorithm and each shortest path query utilizes Dijkstra algorithm.

* * * * *